(No Model.)

F. A. CORTIS.
FLEXIBLE SHAFTING.

No. 261,534. Patented July 25, 1882.

Witnesses.

Frank A. Cortis,
Inventor
By Atty

UNITED STATES PATENT OFFICE.

FRANK A. CORTIS, OF MERIDEN, CONNECTICUT.

FLEXIBLE SHAFTING.

SPECIFICATION forming part of Letters Patent No. 261,534, dated July 25, 1882.

Application filed May 31, 1882. (No model.)

*To all whom it may concern:*

Be it known that I, FRANK A. CORTIS, of Meriden, in the county of New Haven and State of Connecticut, have invented a new Improvement in Flexible Shafting; and I do hereby declare the following, when taken in connection with accompanying drawings and the letters of reference marked thereon, to be a full, clear, and exact description of the same, and which said drawings constitute part of this specification, and represent, in—

Figure 1:
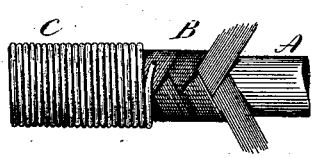
Figure 2:

Figure 1, a side view; Fig. 2, an end view.

This invention relates to an improvement in what is commonly called "flexible shafting"— that is to say, a device for communicating power from a fixed rotating motor to an instrument or other thing on any direct line with that motor, or so that the thing driven may be moved to different positions, the flexibility permitting it to yield for such out-of-line movement or position, and yet communicate the rotation of the motor to the thing to be driven.

In the usual construction of this class of shafts they are made entirely of metal, complicated in their construction, and are so expensive as to practically prohibit their use for many purposes where such shafts would be desirable and where but little power is required.

The object of my invention is to construct a flexible shaft which shall be so cheap as to permit its use for these many light uses; and it consists in a core made from leather or other non-metallic flexible material wrapped with a fabric covering, the wrapping protected or not, as may be required.

A represents the core, which I preferably make from a strip of leather cut or drawn into the cylindrical shape, substantially like the round belting well known in market, and used for sewing-machine belts and other light work. I take this core, and, by a braiding-machine or other similar device, I wrap the core in a fabricated covering, B, and in some cases repeat this covering two or more times to increase the thickness of the wrapping. This completes the shaft.

I find it advantageous to size the fabricated material either during the process of braiding or subsequently.

In some cases it is desirable to protect the fabricated covering of the core. This is best done by winding the covered core with wire, as at C; or it may be protected by inserting the shaft into a tube of india-rubber or other flexible material which will closely fit and protect the surface.

I claim—

1. As an article of manufacture, the herein-described flexible shaft, consisting of the non-metallic core wrapped with a fabricated covering, substantially as described.

2. As an article of manufacture, the herein-described flexible shaft, consisting of the non-metallic core wrapped with a fabricated covering, the fabricated surface protected by wire wound thereon, substantially as described.

FRANK A. CORTIS.

Witnesses:
WM. B. BARNES,
A. W. BRADFORD.